US012209732B2

(12) United States Patent
Feit et al.

(10) Patent No.: US 12,209,732 B2
(45) **Date of Patent: *Jan. 28, 2025**

(54) MULTI-CONFIGURABLE LIGHT EMITTING DIODE (LED) FLAT PANEL LIGHTING FIXTURE

(71) Applicant: FEIT ELECTRIC COMPANY, INC., Pico Rivera, CA (US)

(72) Inventors: Alan Barry Feit, Encino, CA (US); Brian Halliwell, Pico Rivera, CA (US)

(73) Assignee: Feit Electric Company, Inc., Pico Rivera, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/239,280

(22) Filed: Aug. 29, 2023

(65) Prior Publication Data

US 2023/0417381 A1 Dec. 28, 2023

Related U.S. Application Data

(63) Continuation of application No. 17/660,867, filed on Apr. 27, 2022, now Pat. No. 11,781,718, which is a (Continued)

(51) Int. Cl.
*F21S 8/04* (2006.01)
*F21S 8/02* (2006.01)
(Continued)

(52) U.S. Cl.
CPC ............... *F21S 8/043* (2013.01); *F21S 8/061* (2013.01); *F21V 19/0045* (2013.01); (Continued)

(58) Field of Classification Search
None
See application file for complete search history.

(56) References Cited

U.S. PATENT DOCUMENTS 2,518,774 A 8/1950 Grosser
2,545,124 A 3/1951 Tornblom
(Continued)

FOREIGN PATENT DOCUMENTS

CN 202546560 U 11/2012
EP 2473002 A2 7/2012
(Continued)

OTHER PUBLICATIONS

Canadian Intellectual Property Office, for Application No. 2,971,917, dated Jan. 26, 2018, 5 pages, Canada.
(Continued)

*Primary Examiner* — Alan B Cariaso
(74) *Attorney, Agent, or Firm* — Alston & Bird LLP

(57) ABSTRACT

A light emitting diode (LED) flat panel lighting fixture is provided. The LED flat panel lighting fixture comprises an LED flat panel lighting device comprising (a) one or more LEDs and (b) one or more first mating mechanisms. The LED flat panel lighting fixture further comprises a mounting bracket comprising one or more second mating mechanisms configured to each mate with a corresponding one of the one or more first mating mechanisms when the LED flat panel lighting device is rotated within the mounting bracket and with respect to the mounting bracket. The rotation of the LED flat panel lighting device within a plane of the mounting bracket and with respect to the mounting bracket causes the mating of the one or more second mating mechanisms with the corresponding ones of the one or more first mating mechanisms.

20 Claims, 12 Drawing Sheets

Related U.S. Application Data continuation of application No. 17/249,490, filed on Mar. 3, 2021, now Pat. No. 11,339,935, which is a continuation of application No. 16/573,140, filed on Sep. 17, 2019, now Pat. No. 10,969,070, which is a continuation of application No. 15/800,409, filed on Nov. 1, 2017, now Pat. No. 10,465,871, which is a continuation of application No. 14/720,255, filed on May 22, 2015, now Pat. No. 9,835,300.

(60) Provisional application No. 62/002,088, filed on May 22, 2014.

(51) Int. Cl.

| | |
|---|---|
| ***F21S 8/06*** | (2006.01) |
| ***F21V 19/00*** | (2006.01) |
| ***F21V 21/02*** | (2006.01) |
| ***F21V 21/112*** | (2006.01) |
| ***F21Y 105/00*** | (2016.01) |
| ***F21Y 115/10*** | (2016.01) |

(52) U.S. Cl.

CPC ............ *F21V 21/02* (2013.01); *F21V 21/112* (2013.01); *F21S 8/024* (2013.01); *F21Y 2105/00* (2013.01); *F21Y 2115/10* (2016.08)

(56) References Cited

U.S. PATENT DOCUMENTS

| | | | | |
|---|---|---|---|---|
| 3,506,232 | A | 4/1970 | Wolar et al. | |
| 3,780,973 | A | 12/1973 | Dalton | |
| 4,426,126 | A | 1/1984 | De et al. | |
| 5,056,954 | A | 10/1991 | Flux et al. | |
| 5,560,101 | A | 10/1996 | Sandell et al. | |
| 5,806,972 | A | 9/1998 | Kaiser et al. | |
| 6,296,372 | B1 | 10/2001 | Rhomberg | |
| 6,328,461 | B1 | 12/2001 | Younker | |
| 6,517,216 | B1 | 2/2003 | Cercone et al. | |
| 6,653,558 | B1 | 11/2003 | Bucher et al. | |
| 6,769,785 | B1 | 8/2004 | Herst et al. | |
| 6,880,963 | B2 | 4/2005 | Luig et al. | |
| 6,991,352 | B2 | 1/2006 | Garber et al. | |
| 7,111,957 | B2 | 9/2006 | Bernhart et al. | |
| 7,213,938 | B2 | 5/2007 | Brondt et al. | |
| 7,547,112 | B2 | 6/2009 | Kim | |
| 7,631,994 | B2 | 12/2009 | Halliwell et al. | |
| 7,866,850 | B2 | 1/2011 | Alexander et al. | |
| 8,047,673 | B2 | 11/2011 | Santoro | |
| 8,152,336 | B2 | 4/2012 | Alexander et al. | |
| 8,297,579 | B1 | 10/2012 | Gretz | |
| 8,376,592 | B2 | 2/2013 | Engstrom et al. | |
| 8,382,341 | B2 | 2/2013 | Peter | |
| 8,485,700 | B2 | 7/2013 | Ngai | |
| 8,613,529 | B2 | 12/2013 | Watanabe et al. | |
| 8,622,590 | B2 | 1/2014 | Cheng | |
| 8,714,775 | B2 | 5/2014 | Bracher et al. | |
| 8,915,636 | B2 | 12/2014 | Araki et al. | |
| 8,950,921 | B2 | 2/2015 | Sheng | |
| 9,133,981 | B2 | 9/2015 | Lenherr | |
| 9,188,290 | B2 | 11/2015 | Lay et al. | |
| 9,194,561 | B2 | 11/2015 | Wu et al. | |
| 9,228,724 | B2 | 1/2016 | Wu | |
| 9,285,081 | B2 | 3/2016 | Douglas et al. | |
| 9,297,506 | B2 * | 3/2016 | Magnan .................... | F21S 8/04 |
| 9,447,949 | B2 | 9/2016 | Rashidi Doust | |
| 9,453,616 | B2 | 9/2016 | Myers et al. | |
| 9,702,533 | B1 | 7/2017 | Harpenau et al. | |
| 9,714,760 | B2 | 7/2017 | Scoggin | |
| 9,835,300 | B2 | 12/2017 | Feit et al. | |
| 9,897,305 | B2 | 2/2018 | Ryder et al. | |
| 9,927,103 | B2 | 3/2018 | Feit et al. | |
| 10,047,937 | B2 | 8/2018 | Halliwell | |
| 10,234,115 | B2 | 3/2019 | Halliwell | |
| 10,429,044 | B2 | 10/2019 | Halliwell | |
| 10,465,871 | B2 | 11/2019 | Feit et al. | |
| 10,473,306 | B2 | 11/2019 | Feit et al. | |
| 10,634,320 | B2 | 4/2020 | Halliwell | |
| 10,845,015 | B2 | 11/2020 | Brothwell | |
| 10,859,244 | B2 | 12/2020 | Halliwell | |
| 10,895,368 | B2 | 1/2021 | Feit et al. | |
| 10,969,070 | B2 | 4/2021 | Feit et al. | |
| 11,085,614 | B2 | 8/2021 | Halliwell | |
| 11,248,776 | B2 | 2/2022 | Feit et al. | |
| 11,255,522 | B2 | 2/2022 | Halliwell | |
| 11,339,935 | B2 | 5/2022 | Feit et al. | |
| 11,555,599 | B2 | 1/2023 | Halliwell | |
| 11,852,324 | B2 | 12/2023 | Feit et al. | |
| 2003/0060067 | A1 | 3/2003 | Russell | |
| 2003/0082948 | A1 | 5/2003 | Hakkarainen et al. | |
| 2003/0147749 | A1 | 8/2003 | Russell | |
| 2006/0108137 | A1 | 5/2006 | Smith | |
| 2009/0237958 | A1 | 9/2009 | Kim | |
| 2010/0208473 | A1 | 8/2010 | Sakai et al. | |
| 2010/0220497 | A1 | 9/2010 | Ngai | |
| 2011/0185609 | A1 | 8/2011 | Miedema et al. | |
| 2012/0106177 | A1 | 5/2012 | Blankestijn et al. | |
| 2012/0266449 | A1 | 10/2012 | Krupa | |
| 2013/0016504 | A1 | 1/2013 | Garber | |
| 2013/0044512 | A1 | 2/2013 | Araki et al. | |
| 2013/0286667 | A1 | 10/2013 | Sampsell et al. | |
| 2013/0292149 | A1 | 11/2013 | Cooper et al. | |
| 2013/0307420 | A1 | 11/2013 | Yoder et al. | |
| 2014/0063776 | A1 | 3/2014 | Clark et al. | |
| 2014/0071687 | A1 | 3/2014 | Tickner et al. | |
| 2014/0092608 | A1 | 4/2014 | Moser et al. | |
| 2014/0160772 | A1 | 6/2014 | Wu | |
| 2014/0268766 | A1 | 9/2014 | Lu | |
| 2014/0268825 | A1 | 9/2014 | Lay et al. | |
| 2014/0313775 | A1 | 10/2014 | Myers et al. | |
| 2015/0009666 | A1 | 1/2015 | Keng et al. | |
| 2015/0016105 | A1 | 1/2015 | Lin et al. | |
| 2015/0085499 | A1 | 3/2015 | Mandy et al. | |
| 2015/0153031 | A1 | 6/2015 | Myers et al. | |
| 2015/0167903 | A1 | 6/2015 | Yao | |
| 2015/0267873 | A1 | 9/2015 | Price et al. | |
| 2015/0309248 | A1 | 10/2015 | Xu | |
| 2015/0316241 | A1 | 11/2015 | Kaplan et al. | |
| 2015/0338038 | A1 | 11/2015 | Feit et al. | |
| 2015/0338071 | A1 | 11/2015 | Feit et al. | |
| 2016/0033098 | A1 | 2/2016 | Bergman et al. | |
| 2016/0131346 | A1 | 5/2016 | Creasman et al. | |
| 2017/0009962 | A1 | 1/2017 | Feit et al. | |
| 2018/0003366 | A1 | 1/2018 | Halliwell | |
| 2018/0003367 | A1 | 1/2018 | Halliwell | |
| 2019/0368701 | A1 | 12/2019 | Halliwell | |
| 2021/0332971 | A1 | 10/2021 | Halliwell | |
| 2022/0136684 | A1 | 5/2022 | Feit et al. | |
| 2022/0136685 | A1 | 5/2022 | Halliwell | |
| 2022/0252230 | A1 | 8/2022 | Feit et al. | |
| 2023/0119998 | A1 | 4/2023 | Halliwell | |

FOREIGN PATENT DOCUMENTS

| | | | |
|---|---|---|---|
| KR | 10-1398387 | B1 | 5/2014 |
| WO | 2006/037572 | A1 | 4/2006 |

OTHER PUBLICATIONS

Canadian Intellectual Property Office, for Application No. 2,979,140, dated Mar. 22, 2018, 5 pages, Canada.

Canadian Intellectual Property Office, for Application No. 2,979,652, dated Jun. 26, 2018, 4 pages, Canada.

NonFinal Office Action for U.S. Appl. No. 15/800,409, dated Mar. 8, 2019, (26 pages), United States Patent and Trademark Office, US.

NonFinal Office Action for U.S. Appl. No. 16/036,470, dated Oct. 4, 2018, (5 pages), United States Patent and Trademark Office, US.

NonFinal Office Action for U.S. Appl. No. 16/262,287, dated May 24, 2019, (7 pages), United States Patent and Trademark Office, US.

NonFinal Office Action for U.S. Appl. No. 16/573,140, dated Aug. 12, 2020, (10 pages), United States Patent and Trademark Office, US.

(56) References Cited

OTHER PUBLICATIONS

NonFinal Office Action for U.S. Appl. No. 17/660,867, dated Dec. 21, 2022, (16 pages), United States Patent and Trademark Office, US.
Notice of Allowance for U.S. Appl. No. 16/262,287, dated Jun. 13, 2019, (7 pages), United States Patent and Trademark Office, US.
Office Action for U.S. Appl. No. 15/295,519 dated Mar. 8, 2019.
OKTLighting, www.youtube.com/watch?v=xrtp1RTxsEQ, Jan. 21, 2016, timestamp 0:00, 0:14, 0:21-22, 0:27-31, 0:48-1:06.
U.S. Appl. No. 15/272,645, "Flush Mount Lighting Fixture", (filed Sep. 22, 2016), (Alan Barry Feit, Inventor), (Feit Electric Company, Inc., assignee).
U.S. Appl. No. 15/295,519, filed Oct. 17, 2016, U.S. Pat. No. 10,634,320.
U.S. Appl. No. 16/573,140, filed Sep. 17, 2019, U.S. Pat. No. 10,969,070, Patented.
United State Patent and Trademark Office, Office Action for U.S. Appl. No. 15/196,683, dated Jan. 16, 2018, 12 pages, U.S.A.
United States Patent and Trademark Office, Non-Final Office Action for U.S. Appl. No. 17/573,204, filed Dec. 19, 2022, 26 pages, U.S.A.
United States Patent and Trademark Office, Non-Final Office Action for U.S. Appl. No. 17/573,204, filed Jun. 13, 2023, 25 pages, U.S.A.
United States Patent and Trademark Office, Corrected Notice of Allowability for U.S. Appl. No. 15/272,645, filed Feb. 23, 2018, (3 pages), U.S.A.
United States Patent and Trademark Office, Notice of Allowance for U.S. Appl. No. 15/196,683, filed May 2, 2018, 8 pages, U.S.A.
United States Patent and Trademark Office, Notice of Allowance for U.S. Appl. No. 14/720,255, dated Aug. 3, 2016, 14 pages, U.S.A.
United States Patent and Trademark Office, Notice of Allowance for U.S. Appl. No. 15/272,645, dated Nov. 16, 2017, 14 pages, U.S.A.
United States Patent and Trademark Office, Notice of Allowance received for U.S. Appl. No. 16/573,140, dated Dec. 30, 2020, 9 pages, U.S.
United States Patent and Trademark Office, Notice of Allowance received for U.S. Appl. No. 16/822,962, filed Apr. 28, 2021, 20 pages, U.S.
United States Patent and Trademark Office, Office Action for U.S. Appl. No. 14/720,255, filed Nov. 1, 2016, 20 pages, U.S.A.
United States Patent and Trademark Office, Office Action for U.S. Appl. No. 14/720,255, dated Apr. 26, 2017, 16 pages, U.S.A.
United States Patent and Trademark Office, Office Action for U.S. Appl. No. 15/295,519, dated Aug. 24, 2018, 13 pages, U.S.A.
United States Patent and Trademark Office, Office Action for U.S. Appl. No. 15/295,519, filed Oct. 31, 2019, (15 pages), U.S.A.
United States Patent and Trademark Office, Office Action for U.S. Appl. No. 15/898,711, filed Jul. 22, 2019, (14 pages), U.S.A.
United States Patent and Trademark Office, Office Action for U.S. Appl. No. 16/551,194, dated Apr. 16, 2020, 17 pages, U.S.
Non-Final Rejection Mailed on Oct. 1, 2024 for U.S. Appl. No. 18/508,829, 12 page(s).

* cited by examiner

MULTI-CONFIGURABLE LIGHT EMITTING DIODE (LED) FLAT PANEL LIGHTING FIXTURE

CROSS-REFERENCE TO RELATED APPLICATIONS

This application is a continuation of U.S. application Ser. No. 17/660,867, filed Apr. 27, 2022, which is a continuation of U.S. application Ser. No. 17/249,490, filed Mar. 3, 2021, which is a continuation of U.S. application Ser. No. 16/573,140, filed Sep. 17, 2019, which is a continuation of U.S. application Ser. No. 15/800,409, filed Nov. 1, 2017, which is a continuation of U.S. application Ser. No. 14/720,255, filed May 22, 2015, which claims priority to U.S. Provisional Application Ser. No. 62/002,088, filed May 22, 2014, the contents of which are hereby incorporated herein in their entireties.

BACKGROUND

Progress in the field of engineering and manufacturing light emitting diodes (LEDs) has resulted in an increased interest in employing LED lamps in general lighting applications. Particularly, an interest exists in developing LED technology to provide energy efficient and lighting solutions that not only provide utilitarian benefits but that are also aesthetically pleasing.

BRIEF SUMMARY

Generally described, various embodiments of the present invention comprise a thin, edge-lit LED flat panel light configured to be installed in a variety of ways. For example, in various embodiments, the LED flat panel light is configured to be installed in three different ways. For example, the LED flat panel light may be configured to be mounted flush with a junction box in a ceiling or wall, suspended from a junction box as a pendent, and mounted flush with a wall. In this manner, a universal and multi-configurable LED flat panel light is provided. Various embodiments of the present invention provide a mounting bracket that may be used to install the LED flat panel light in a variety of ways, a mounting kit configured for providing an installer with brackets, clips, and/or the like for installing the LED flat panel light in a variety of ways, methods for installing and/or mounting the LED flat panel light in a variety of ways and/or the like.

In one aspect of the present invention, an LED flat panel light is provided. In one embodiment, the LED flat panel light comprises a front cover and a back cover; a ring positioned between the front cover and the back cover; at least one LED mounted within the ring such that light emitted by the LED is emitted toward a central region of the ring; and a frame having an interior edge. The interior edge of the frame is in contact with a perimeter of the front cover and a perimeter of the back cover. The frame comprises one or more knobs extending outwardly from an external edge of the frame.

In another aspect of the present invention, a mounting bracket for mounting an LED flat panel light is provided. In one embodiment, the mounting bracket comprises a bracket a frame. The bracket frame comprises one or more notches configured to each receive a knob of the LED flat panel light; and a locking mechanism associated with each of the one or more notches. Each locking mechanism is configured to retain the knob received by the associated notch. The bracket frame may further comprise one or more suspension wire receiving mechanisms, each suspension wire receiving mechanism configured to receive and retain a suspension wire for suspending the LED flat panel light as a pendant light; and one or more junction mount securing mechanisms configured to have a junction mount secured thereto.

In yet another aspect of the present invention, an LED flat panel light mounting kit is provided. In one embodiment, the mounting kit comprises an LED flat panel light. The LED flat panel light comprises at least one knob extending outwardly from an external edge of the LED flat panel light. The mounting kit further comprises a mounting bracket. The mounting bracket comprises a bracket frame. The bracket frame comprises one or more notches configured to each receive a knob of an LED flat panel; and a locking mechanism associated with each of the one or more notches. The locking mechanism is configured to retain the knob received by the associated notch. The bracket frame may further comprise one or more suspension wire receiving mechanisms, each suspension wire receiving mechanism configured to receive and retain a suspension wire for suspending the LED flat panel as a pendant light; and one or more junction mount securing mechanisms configured to have a junction mount secured thereto. The mounting kit may further comprise a junction mount configured to mount the mounting bracket to a junction box; a suspension bracket configured to mount to a junction box and suspend the LED flat panel light therefrom; and one or more spring-loaded wall clips configured for mounting the LED flat panel light within a wall.

BRIEF DESCRIPTION OF THE SEVERAL VIEWS OF THE DRAWING(S)

Having thus described various embodiments of the invention in general terms, reference will now be made to the accompanying drawings, which are not necessarily drawn to scale, and wherein:

DETAILED DESCRIPTION

Various embodiments of the present invention now will be described more fully hereinafter with reference to the accompanying drawings, in which some, but not all embodiments are shown. Indeed, the invention may be embodied in many different forms and should not be construed as limited to the various embodiments set forth herein; rather, the embodiments described herein are provided so that this disclosure will satisfy applicable legal requirements. Like numbers refer to like elements throughout.

Various embodiments of the present invention provide a mounting kit for an LED flat panel light that may allow for mounting the LED flat panel light in a variety of ways. For example, the mounting kit may provide brackets, clips, etc. for suspending the LED flat panel light from a junction box in a ceiling or other horizontal surface; flush mounting the LED flat panel light to a junction box in a wall, ceiling, and/or the like; or flush mounting the LED flat panel light in a wall, ceiling, and/or the like without mounting to a junction box. In various embodiments, the mounting kit may provide suspension wires for suspending the LED flat panel light as pendent, fasteners for fastening various brackets together, to the LED flat panel light, and/or to a junction box, and/or the like.

In various embodiments, mounting brackets may be provided for mounting the LED flat panel light. For example, one mounting bracket may be configured to allow the LED flat panel light to be suspended as a pendent or flush mounted to a junction box. In various embodiments, an LED flat panel light that may be installed and/or mounted in a variety of ways is provided. In yet other embodiments, methods for installing and/or mounting an LED flat panel light in a variety of ways are provided. Elements of various embodiments of the present invention will now be described in more detail herein.

I. LED FLAT PANEL LIGHT 100

Figure 1B:
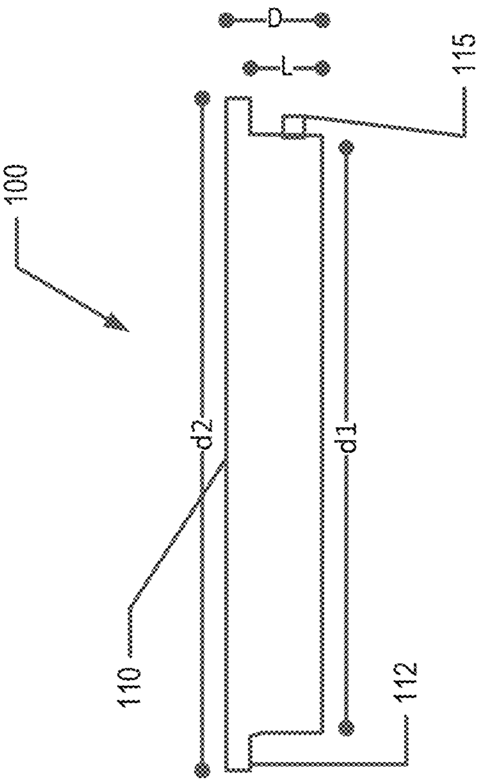
FIG. 1B is a side view of the LED flat panel light shown in FIG. 1A.
Figure 1A:
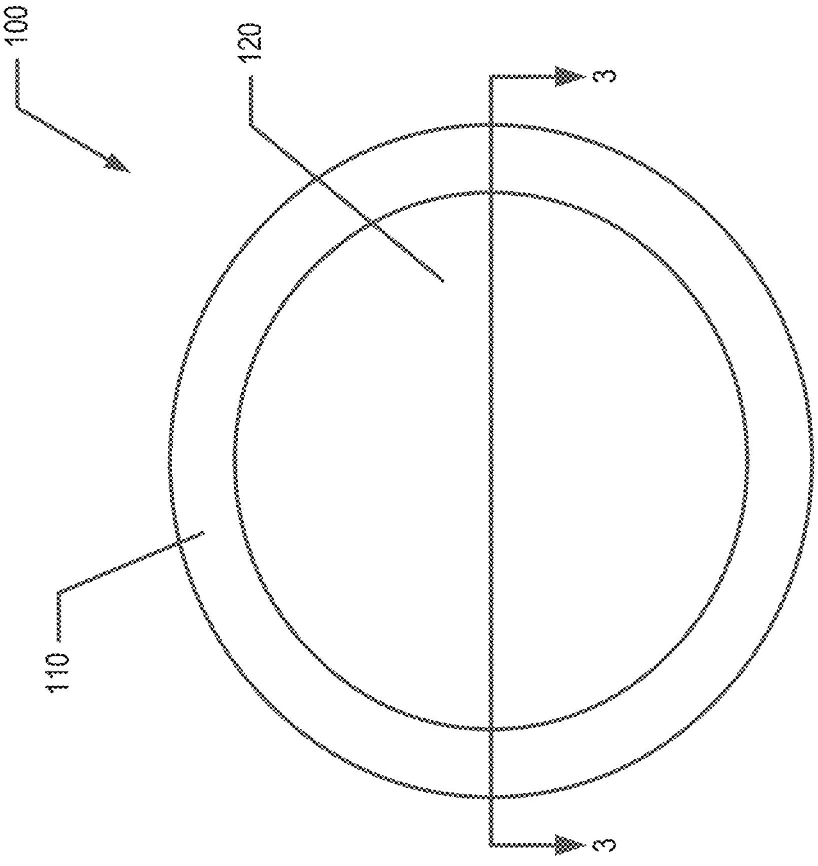
FIG. 1A is a front view of an LED flat panel light, in accordance with an embodiment of the present invention.
Figure 2:
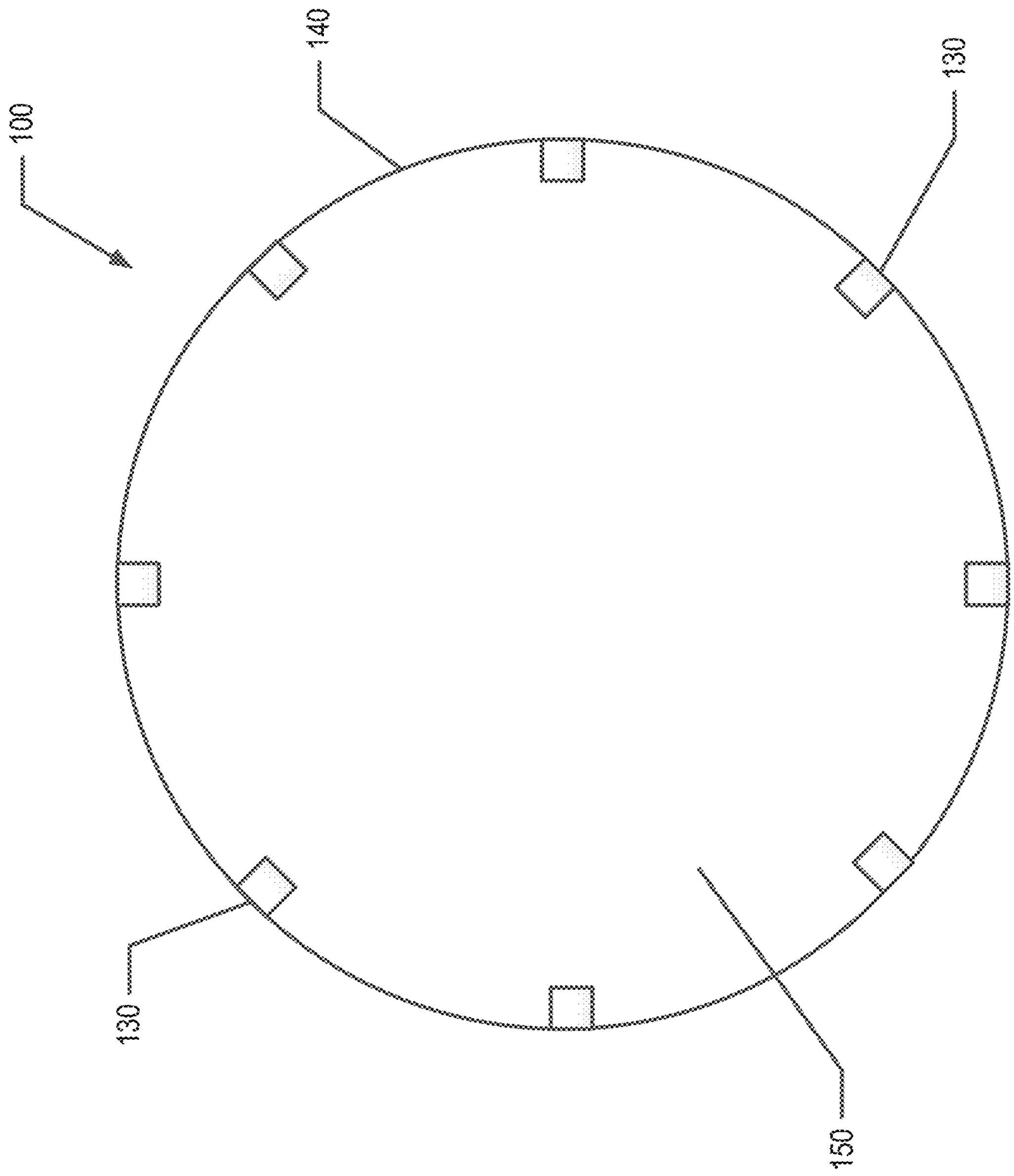
FIG. 2 is a front view of the LED flat panel light shown in FIG. 1A with the frame and cover removed.
Figure 3A:
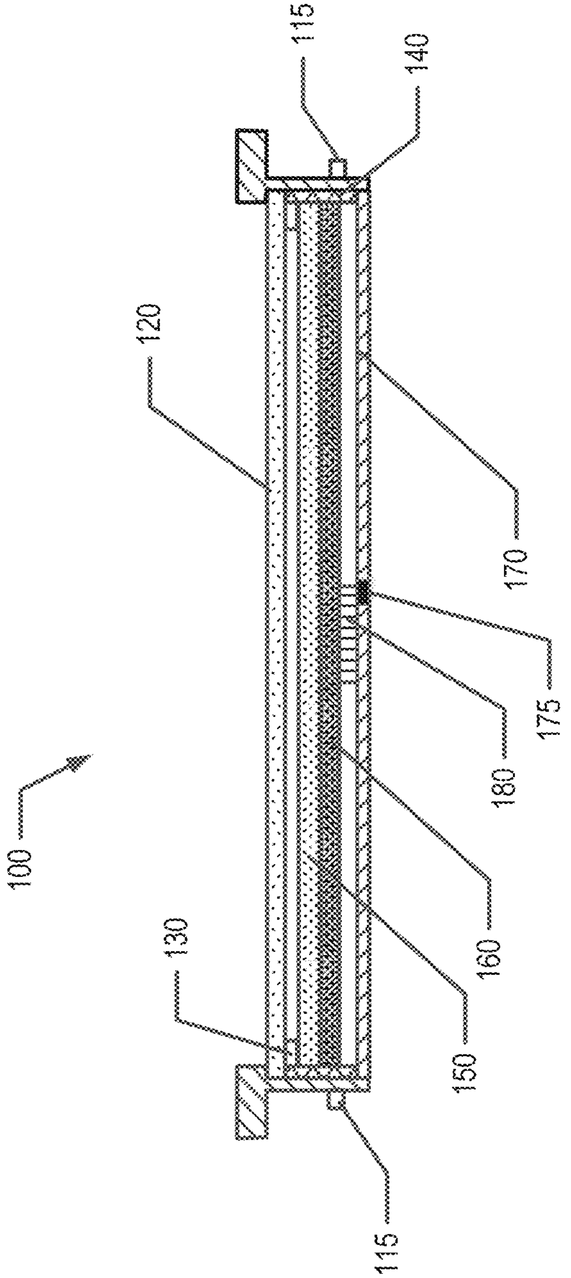
FIG. 3A is a cross-sectional view of the LED flat panel light shown in FIG. 1A.
Figure 4:
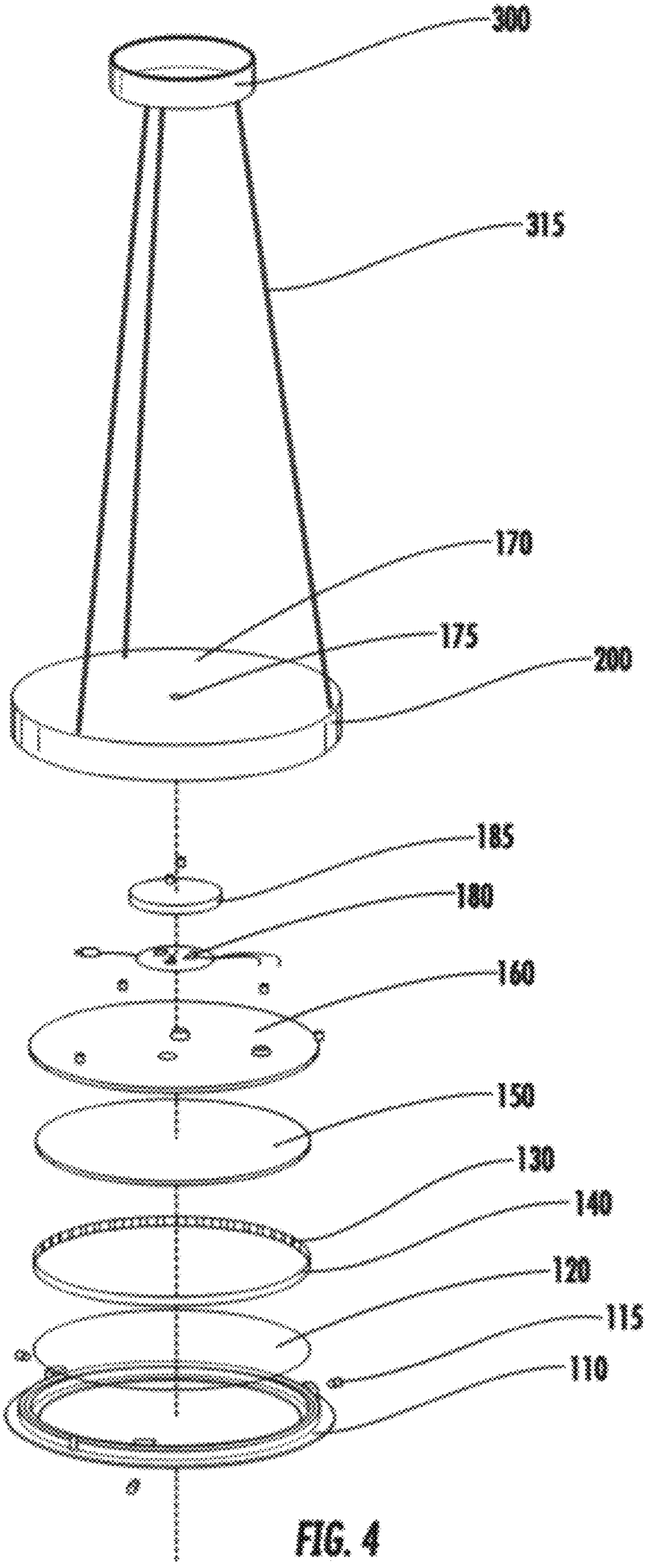
FIG. 4 is an exploded view of an LED flat panel light mounted in a mounting bracket and prepared for mounting as a pendent, in accordance with an embodiment of the present invention.

FIGS. 1A and 1B show a front view and a side view of a LED flat panel light 100. FIG. 2 shows a front view of the LED flat panel light 100 with the frame 110 and the front cover 120 removed, FIG. 3A provides a cross-sectional view of the LED flat panel light 100, and FIG. 4 shows an exploded view of an LED flat panel light 100. The LED flat panel light 100 may include at least one LED 130. In various embodiments, the at least one LED 130 is mounted on a ring 140. The at least one LED may be mounted on the ring 140 such that the light emitted by the at least one LED 130 is directed toward the center of the ring 140. The LED flat panel light 100 may include a light guide 150. The light guide 150 may be configured to direct light emitted by the at least one LED 130 toward the front cover 120. In various embodiments, the LED flat panel light 100 may also include a reflector 160 disposed behind the light guide 150, a back cover 170 disposed behind the light guide 150, and/or driver circuitry 180. The reflector 160 may be configured to reflect light toward the front cover 120. The back cover 170 may be configured to seal the LED flat panel light 100 from dirt and/or moisture, provide structural support to the LED flat panel light 100, enclose the electrical components (e.g., the at least one LED 130 and/or the driver circuitry 180) of the LED flat panel light 100, and/or the like. In various embodiments, the LED flat panel light 100 may also include a driver circuitry protective cover 185 (see FIG. 4) configured to enclose and/or protect the driver circuitry 180. In various embodiments, the ring 140 and/or reflector 160 may be configured to act as a heat sink for the electrical components (e.g., the at least one LED 130 and/or the driver circuitry 180) of the LED flat panel light 100. In various embodiments, the frame 110 may also act as the ring 140.

In various embodiments, the LED flat panel light 100 may be square, rectangular, circular, polygonal, and/or have any of a variety of other, even possibly irregular, shapes. In various embodiments, the shape of ring 140 may have approximately the same shape as the LED flat panel light 100. The LED flat panel light 100 may be configured to be thin. For example, the thickness of the LED flat panel light 100, D, may be approximately half an inch to one inch, or smaller. In some embodiments, D is approximately the same thickness as an average piece of dry wall or other wall covering material (e.g., shiplap, paneling, etc.). In some embodiments, the thickness of the LED flat panel light 100 minus the lip 112, L, is approximately the same thickness as an average piece of drywall or other wall covering material (e.g., shiplap, paneling, etc.). For example, L may be approximately three-eighths to five-eighths of an inch. In another embodiment, L may be approximately three-quarters of an inch. In some embodiments, L or D may be between one and two inches. The LED flat panel light 100 may be configured such that the LED flat panel light 100 may be flush mounted to a junction box 500 (see FIG. 11), suspended as a pendant from a junction box 500 (see FIG. 10), or flush mounted to a wall (e.g., flush mounted into the drywall, shiplap, paneling and/or the like; see FIG. 12).

A. Frame 110

The frame 110 is configured to provide structural support to the LED flat panel light 100. In various embodiments, the frame 110 may be configured to enclose the edges of the LED flat panel light 100 and/or define the outside perimeter of the LED flat panel light 100. For example, an inner edge of the frame 110 may be in contact with the perimeter of the front cover 120 and the perimeter of the back cover 170 and may act to enclose the space between the front cover 120 and the back cover 170. In another embodiment, the perimeter of the front cover 120 may be enclosed within frame 110, such that the perimeter of the front cover 120 is not visible to a user.

In various embodiments, an external edge of the frame 110 may include a lip 112 configured to allow the LED flat panel light 100 to be mounted flush within a wall, ceiling, or the like, without falling into the wall, ceiling, or the like and/or to provide an aesthetically pleasing finish. For example, the external edge of the frame 110 may define two diameters, a first diameter d1 around the back of the frame 110 and a second diameter d2 around the front of the frame 110. The second diameter may be larger than first diameter (d2>d1). This may allow the LED flat panel light 100 to be flush mounted into a wall and prevent the LED flat panel light 100 from falling into the wall. For example, the LED flat panel light 100 may be flush mounted into a hole in a wall that is larger than the first diameter d1 and smaller than the second diameter d2. In various embodiments, the second diameter d2 is approximately a quarter of an inch to an inch larger than the first diameter d1.

Figure 3B:
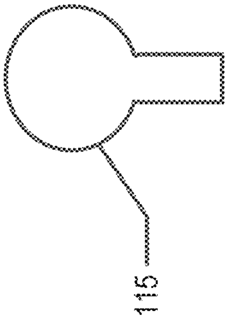
FIG. 3B is a cross-sectional view of a knob in accordance with an embodiment of the present invention.
Figure 8:
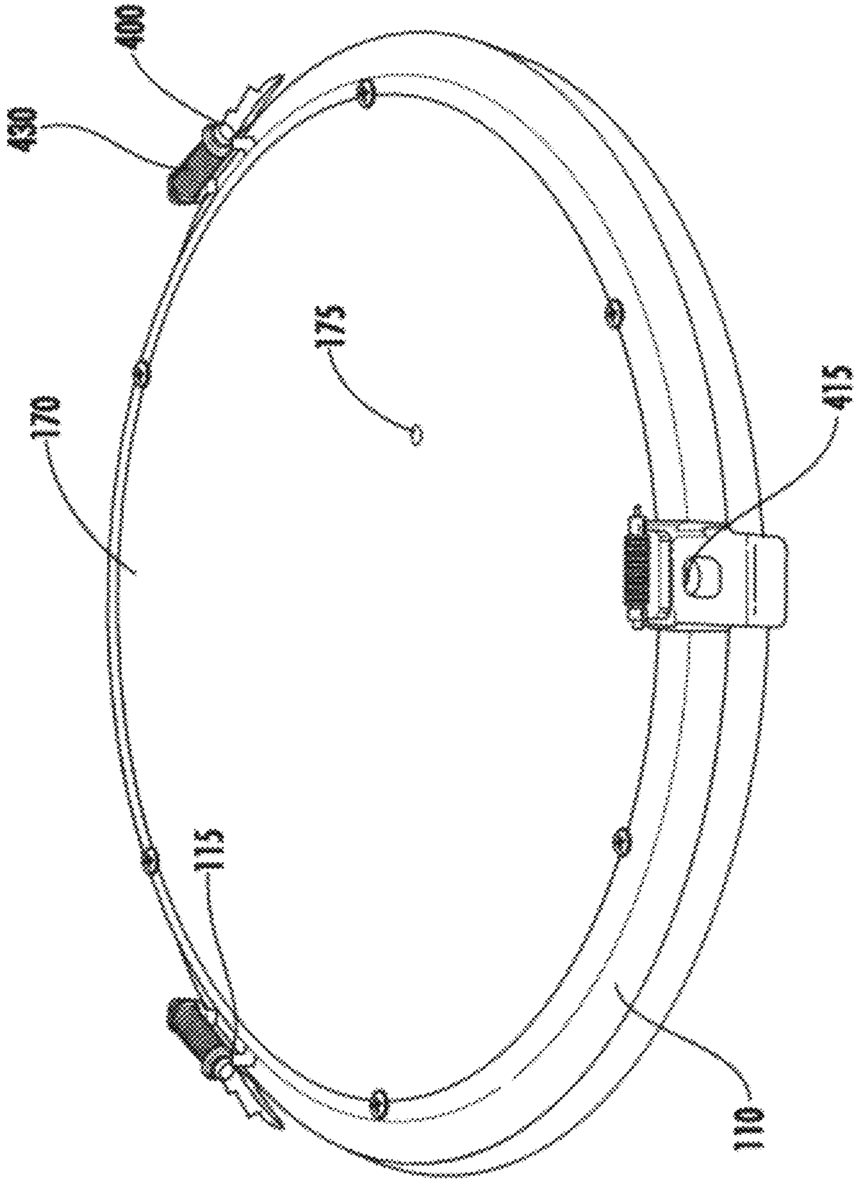
FIG. 8 is perspective view of an LED flat panel light prepared for flush mounting with drywall, in accordance with an embodiment of the present invention.

In various embodiments, the frame 110 may be configured to secure the LED flat panel light 100 to a mounting frame 200 (shown in FIG. 5) and/or spring-loaded wall clips 400 (shown in FIG. 8). For example, the frame 110 may comprise knobs 115 configured to secure the LED flat panel light 100 to the mounting frame 200 and/or the spring-loaded wall clips 400. In various embodiments, the frame 110 may comprise one or more knobs 115. In a particular embodiment, the frame 110 may comprise three knobs 115 equally spaced around the exterior of the frame 110. In various embodiments the knobs may extend outwardly from the exterior of the frame 110. FIG. 3B illustrates a cross-section of a knob 115 in one embodiment. For example, the knob 115 may have a rounded portion and a linear portion with the linear portion secured to the frame 110. This configuration may allow the knob 115 to be inserted into a notch 215 of the mounting bracket 200 and retained by the locking mechanism 220 thereof. In some embodiments, the knob 115 may be configured to receive a fastener (e.g., a screw) into the end thereof. For example, the end of the knob 115 that extends out from the frame 110 may be configured to receive a fastener (e.g., a screw) therein.

In various embodiments, the frame 110 may be made from a polymerized material, as commonly known and understood in the art. In certain embodiments, the frame 110 may be made of plastic or any of a variety of (or combination of) other appropriate materials. In various embodiments, the frame 110 may be approximately one inch thick or thinner. In some embodiments, the frame 110 may be one to one and a half inches thick. In other embodiments, the frame 110 may be thicker than one and a half inches. In various embodiments, the thickness of frame 110 may be approximately D or L.

As discussed elsewhere herein, the LED flat panel light 100 may have any shape. In other embodiments, the shape of the LED flat panel light 100 may be determined at least in part by the frame 110. For example, the front of the frame 110 (e.g., the portion of the frame 110 adjacent the front cover 120) may be round, square, polygonal, elliptical, or irregular. The back of the frame 110 (e.g., the portion of the frame 110 adjacent the back cover 170), may be round or a shape different from the front of the frame 110. For example, the front of the frame 110 may be configured to provide an aesthetically pleasing and/or interesting appearance the back portion of the frame may be configured for easy installation of the LED flat panel light 100.

B. Front Cover 120

The front cover 120 may be configured such that at least some portion of the light emitted by the at least one LED 130 can pass through the front cover 120. For example, in various embodiments, the front cover 120 may be configured such that at least 10% of the light emitted by the at least one LED 130 can pass through the front cover 120. In some embodiments, the front cover 120 may be configured such that a significant fraction of the light emitted by the at least one LED 130 can pass through the front cover 120. For example, in certain various embodiments, the front cover 120 may be configured to permit 10-30%, 30-50%, or 60-80% of the light emitted by the at least one LED 130 and incident upon the front cover 120 to pass through the front cover 120. In some embodiments, the front cover 120 may be configured to permit at least 50% of the light emitted by the at least one LED 130 to pass through the front cover 120. In certain embodiments, the front cover 120 may be configured such that substantially all of the light emitted by the at least one LED 130 and incident on the front cover 120 may pass through the front cover 120. For example, in some embodiments, the front cover 120 may be configured to permit more than 80%, or in certain embodiments, more than 90%, of the light emitted by the at least one LED 130 and incident upon the front cover 120 to pass through front cover 120.

In various embodiments, the front cover 120 may be made from a polymerized material, as commonly known and understood in the art. In certain embodiments, the front cover 120 may be made of plastic. In some embodiments, the front cover 120 may be made of an opaque material; however, in other embodiments, the front cover 120 may be made of any of a variety of translucent or semi-translucent materials, as may be commonly known and used in the art. Still further, according to other embodiments, the front cover 120 may be clear or frosted. In at least one embodiment, the front cover 120 may be made of Smart Glass, or some other material that can transition from clear to frosted and/or vice versa. In yet other embodiments, the front cover 120 may be tinted with various colors. For example, in at least one embodiment, the front cover 120 may be tinted blue to give the light emitted by the lamp a blue glow. Indeed, it should be understood that the front cover 120 may be made from any of a variety of materials, as may be commonly known and used and readily available in the art, provided such possess the light transmission characteristics that are desirable for particular applications.

In various embodiments, the translucent or semi-translucent material may permit passage of at least some portion of the light emitted by the at least one LED 130 and incident upon the front cover 120 to pass through the front cover 120. In certain embodiments, the translucent or semi-translucent material may allow passage of at least 10% of the light emitted by the at least one LED 130 to pass through the front cover 120. In at least one embodiment, the translucent or semi-translucent material may permit passage of 10-30% of the light emitted by the at least one LED 130 and incident upon the cover to pass through the front cover 120. In other certain embodiments, the translucent or semi-translucent material may be configured to permit passage of 30-50% of the light emitted by the at least one LED 130 to pass through the front cover 120. In still other embodiments the translucent or semi-translucent material may permit passage of more than 50%, or, in certain various embodiments, more than 80%, of the light emitted by the at least one LED 130 to pass through front cover 120. Alternatively, the translucent or semi-translucent material may permit passage of 60-80% of the light emitted by at least one LED 130 to pass through the front cover 120. Indeed, it should be understood that according to various embodiments, the front cover 120 may be configured to permit at least some desired portion of the light emitted by the at least one LED 130 and incident upon the front cover 120 to pass through the front cover 120, however as may be beneficial for particular applications.

C. Light Emitting Diode (LED) 130

As shown in FIGS. 2, 3A, and 4 the LED flat panel light 100 also comprises at least one light emitting diode (LED) 130. In embodiments having more than one LED, the LEDs 130 may have different wattages and/or different color temperatures. In various embodiments, the LED flat panel light 100 is an edge-lit panel. For example, the one or more LEDs 130 may be secured along the inside perimeter of the LED flat panel light 100 (e.g., along the inner edge of ring 140) such that the light emitted by the one or more LEDs 130 is emitted toward the middle of the ring 140. Also, various embodiments of the LED flat panel light 100 may employ LEDs 130 that emit different levels of illumination at different color temperatures. The number of LEDs 130 used may also be utilized to determine the level of illumination emitted by the LED flat panel light 100.

D. Driver Circuitry 180

As illustrated in FIG. 3, driver circuitry 180 is disposed within the LED flat panel light 100. In various embodiments, the driver circuitry 180 may comprise a circuit portion configured to convert the input alternating current (AC) line voltage to a direct current (DC) voltage. In various embodiments, the driver circuitry 180 may comprise a circuit portion configured to control the current being applied to the one or more LEDs 130. The driver circuitry 180, in various embodiments, may further comprise a circuit portion configured to allow a user to adjust the brightness of the light emitted from the LED flat panel light 100 through the use of a dimmer switch. These circuitry portions are commonly known and understood in the art, and thus will not be described in detail herein. In various embodiments, the driver circuitry 180 may include other circuitry portions and/or the circuitry portions described herein may not be distinct circuitry portions. For example, in some embodiments, the circuitry portion that converts the AC line voltage to a DC voltage may also control the current being applied to the one or more LEDs 130.

In various embodiments, the driver circuitry 180 is disposed within the chamber defined by the back cover 170 and the reflector 160. In some embodiments, the driver circuitry may be mounted on the back cover 170. In other embodiments, the driver circuitry may be mounted on the reflector 160. In certain embodiments, some components of the driver circuitry 180 may be mounted to the reflector 160 while other components of the driver circuitry 180 may be mounted to the back cover 170.

Figure 11:
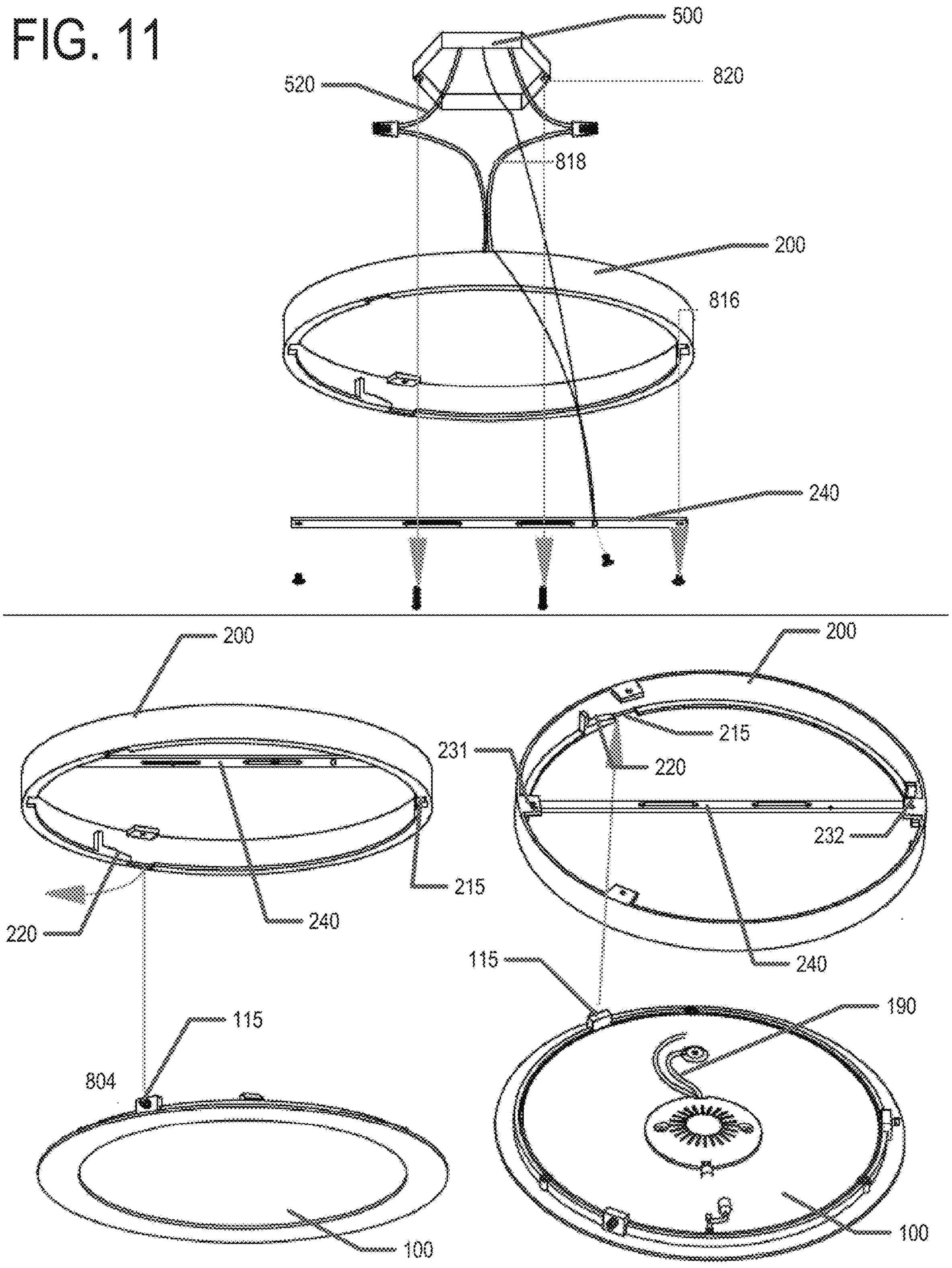

In various embodiments, the LED flat panel light 100 comprises a driver circuitry protective cover 185. The driver circuitry protective cover 185 may be configured to enclose at least a portion of the driver circuitry 180. For example, the driver circuitry protective cover 185 may be configured to may be configured to seal the driver circuitry 180 from dust, dirt, moisture and/or the like. In some embodiments, the LED flat panel light 100 may comprise a driver circuitry protective cover 185 in place of a back cover 170, as shown in FIG. 11.

E. Light Guide 150

In various embodiments, the LED flat panel light 100 may comprise a light guide 150. In various embodiments, the light guide 150 may be configured to direct the light emitted by the one or more LEDs 130 toward the front cover 120. For example, the light emitted by the one or more LEDs 130 may travel through the light 150 until reaching a particular point wherein the light guide 150 directs at least a portion of the light (e.g., via scattering, diffraction, internal reflection, and/or the like) toward the front cover 120. In various embodiments, a reflector 160 may be positioned behind the light guide such that light directed away from the front cover 120 may be reflected back toward the front cover 120. A variety of light guides are known and understood in the art and may be employed herein for various applications. In various embodiments, the light guide 150 may be made of polymeric material as is known in the art, glass, and/or other translucent and/or partially translucent material, as appropriate for the application.

F. Back Cover 170

In various embodiments, the LED flat panel light 100 may comprise a back cover 170. The back cover 170 may be configured to seal the interior of the LED flat panel light 100 from dust, dirt, moisture and/or the like; enclose the electrical components (e.g., the at least one LED 130 and/or the driver circuitry 180) of the LED flat panel light 100; provide structural support for the LED flat panel light 100; and/or the like. In some embodiments, the back cover 170 may comprise wire conduit 175 (shown in FIG. 7). The wire conduit 175 may be a hole or passage through the back cover such that a wire carrying line voltage may be connected to the driver circuitry 180 and/or other electrical component of LED flat panel light 100. For example, in one embodiment, connecting wires 190 (see FIGS. 11 and 12) may be connected to the driver circuitry 180 and pass through the wire conduit 175 such that he connecting wires 190 may be connected to line voltage wires 520. In various embodiments, the wire conduit 175 may be configured to provide a seal around the connecting wires 190 to prevent dust, dirt, and/or moisture from entering the interior of the LED flat panel light 100. In various embodiments, electrical connecting wires 190 may be secured to the driver circuitry 180 or other electrical component of the LED flat panel light 100. The electrical connecting wires 190 may pass through the wire conduit 175 and be configured to connect the electrical components (e.g., driver circuitry 180, the at least one LED 130, and/or the like) of the LED flat panel light 100 with line voltage and/or other electrical power. As should be understood, the LED flat panel light 100 described herein provides various examples of LED flat panel lights that may be mounted via the various methods described herein.

II. MOUNTING BRACKET 200

Figure 5:
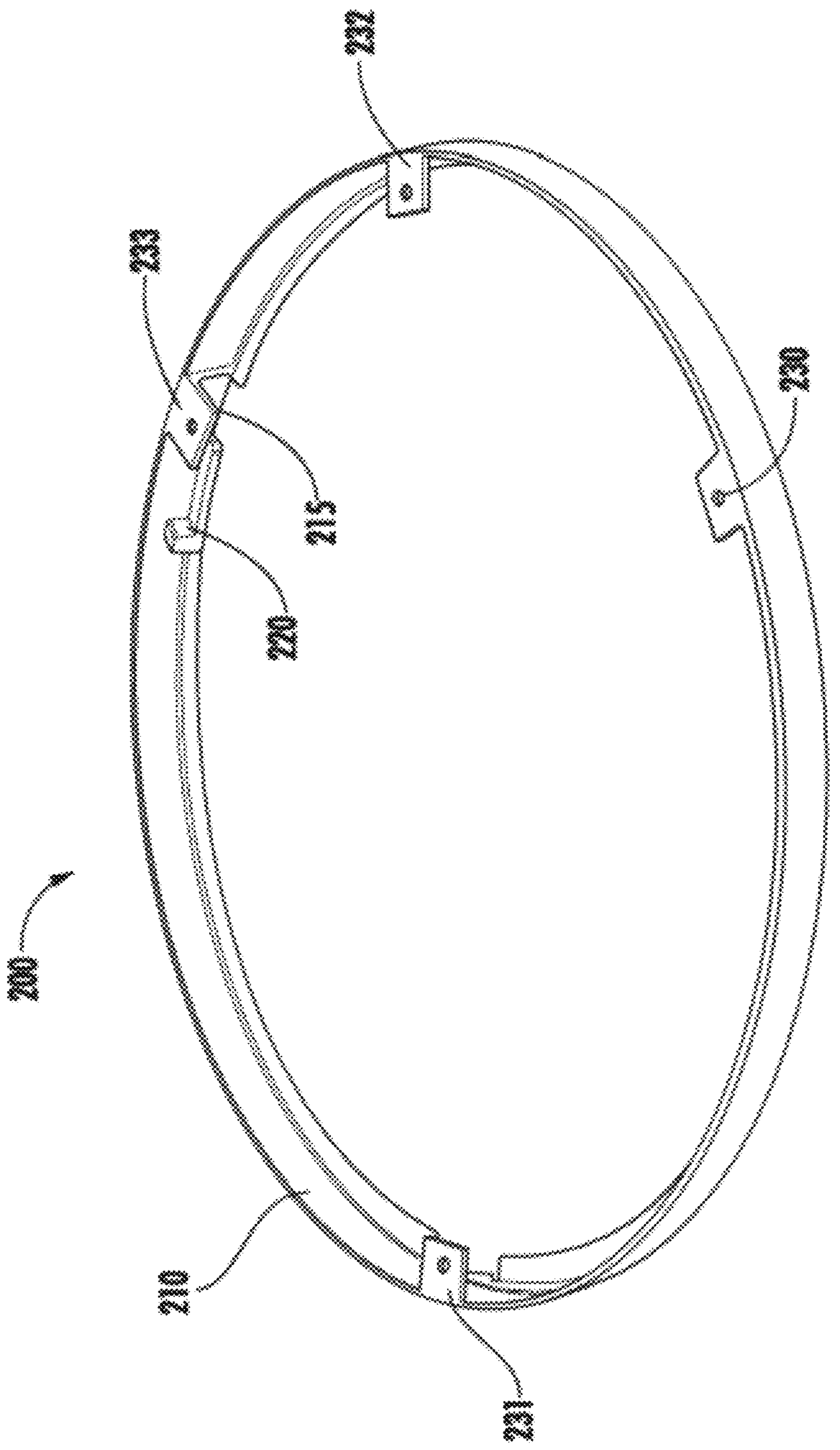
FIG. 5 is a perspective view of a mounting bracket, in accordance with an embodiment of the present invention.

FIG. 5 illustrates a mounting bracket 200 in accordance with an embodiment of the present invention. The mounting bracket 200 may be configured to be secured to the LED flat panel light 100. For example, the illustrated mounting bracket 200 comprises a bracket frame 210 having notches 215 therein for receiving at least a portion of knobs 115. For example, a notch 215 may be configured to receive a rounded portion of a knob 115. In various embodiments, the bracket frame 210 may comprise a notch 215 for each knob 115. The notch 215 may be configured such that each notch 215 may receive a knob 115; the mounting bracket 200 and the LED flat panel light 100 may then be rotated with respect to each other such that each knob 115 is secured to the mounting bracket 200 via the locking mechanism 220. For example, the locking mechanism 220 may be configured to retain a knob 115 (e.g., a rounded portion of a knob 115) therein. Of course, any of a variety of interlocking mechanisms may be incorporated, in part, as may be desirable for particular applications without departing from the spirit of the present invention.

Figure 6:
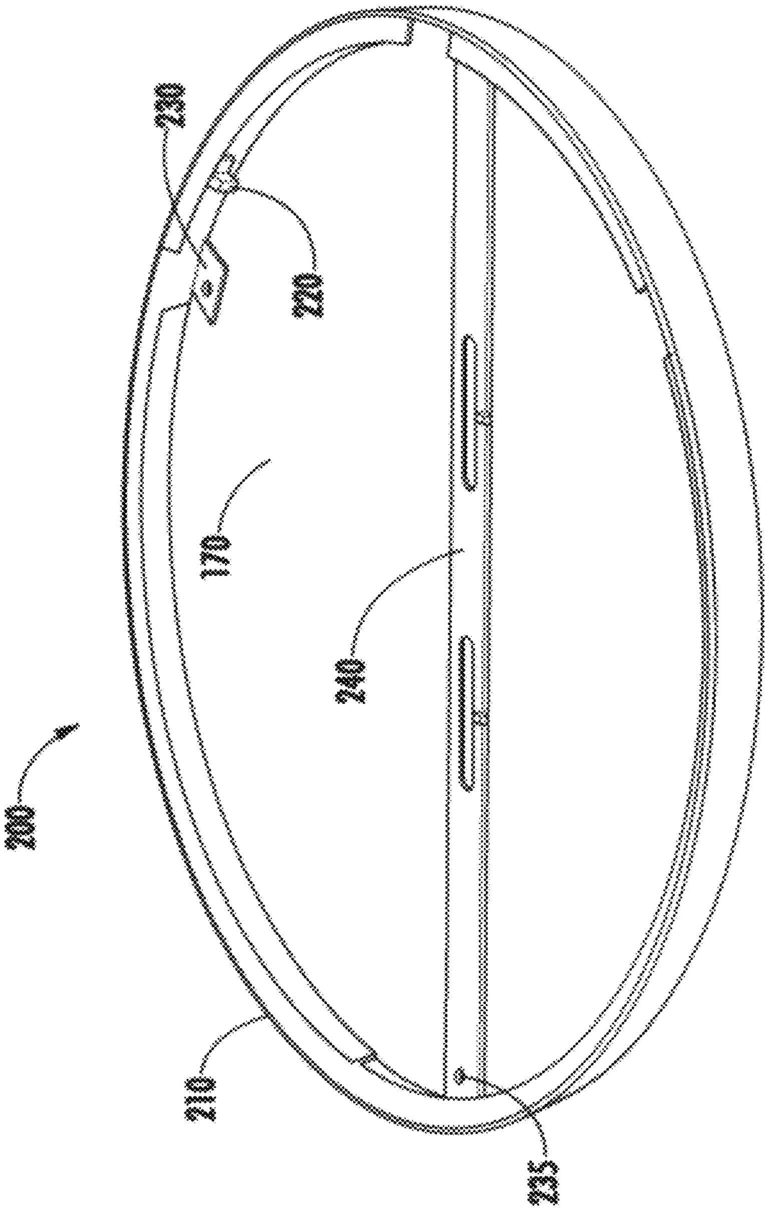
FIG. 6 is a perspective view of a mounting bracket secured to an LED flat panel light, in accordance with an embodiment of the present invention.
Figure 7:
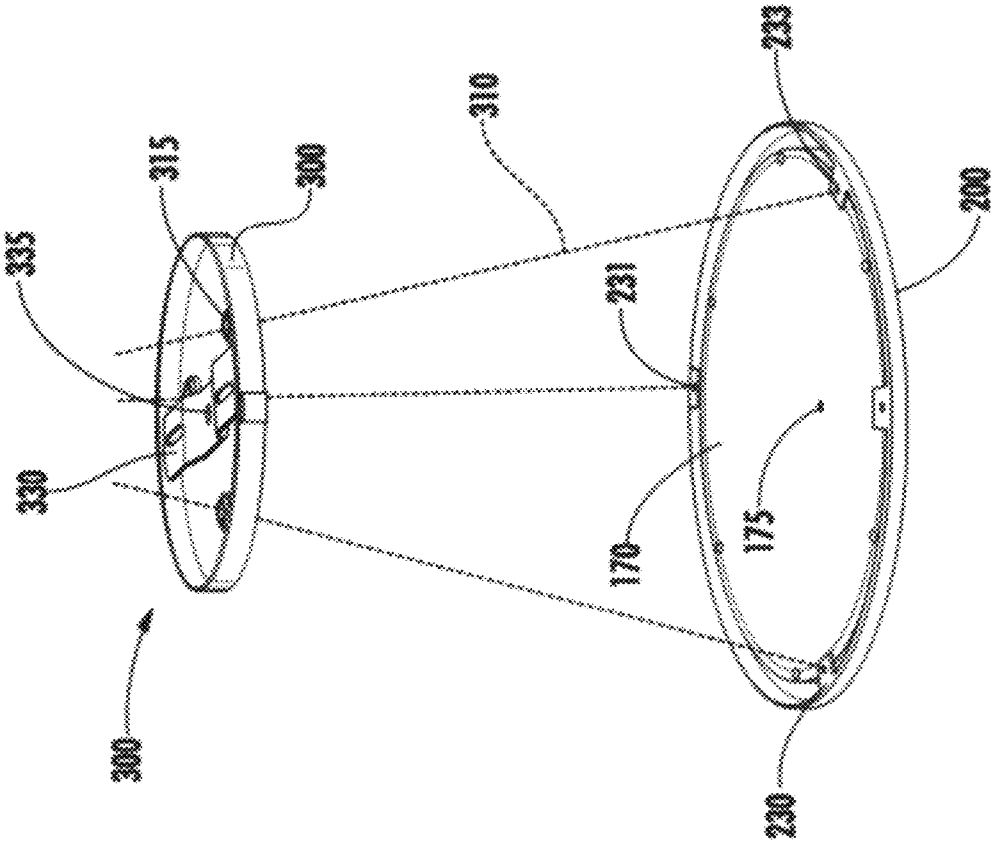
FIG. 7 is a perspective view of an LED flat panel prepared for mounting as a pendant, in accordance with an embodiment of the present invention.

The mounting bracket 200 may further comprise mechanisms for securing suspension wires 310 to the mounting bracket 200 and/or securing a junction mount 240 to the mounting bracket 200. For example, the mounting bracket 200 may comprise tabs 230, 231, 232, 233. The tabs may be configured for securing additional mounting hardware to the mounting bracket 200 and/or the LED flat panel light 100. For example, a junction mount 240 may be secured to the mounting bracket 200 via tabs 231, 232 (as shown in FIG. 6). For example, the junction mount may be secured to tabs 231 and 232 via fasteners (e.g., screws). For example, one or more fasteners may be used to secure the junction mount to each of the tabs 231 and 232. In another example, suspension wires 310 may be secured to the mounting bracket 200 via tabs 230, 231, 233 (as shown in FIG. 7). For example, an end of the suspension wire 310 may include a nut, knot or other element such that one end of the suspension wire 310 may be passed through a hole in the tab 230, 231, 233 but the other end cannot pass through the hole.

In various embodiments, the mounting bracket 200 may be made of a polymeric material as is known in the art. For example, the mounting bracket 200 may be made of plastic. In various embodiments, the mounting bracket 200 may be made of any material appropriate for the application. In various embodiments, at least one of the tabs 230, 231, 232, 233 or other suspension wire or junction mount securing mechanism may be integrally formed with the bracket frame 210.

As shown in FIG. 11, a junction mount 240 may be secured to the mounting bracket 200 via tabs 231, 232. For example, the junction mount 240 may be secured to the mounting bracket 200 via screws, a twist and lock element, and/or other securing mechanism. The junction mount 240 may be configured to flush mount the LED flat panel light 100 to a junction box located in a wall, ceiling, and/or the like. In various embodiments, the junction mount 240 may be made of plastic, aluminum, or other appropriate material.

III. SUSPENSION BRACKET 300

FIG. 6 illustrates an LED flat panel light 100 suspended from a suspension bracket 300 via a mounting bracket 200 and three suspension wires 310. The suspension bracket 300 may be configured to be secured to a junction box located in a ceiling or other surface from which the LED flat panel light 100 may be suspended. For example, a junction bracket 330 may be secured to a suspension bracket 300. The junction bracket 330 may be configured to secure the suspension bracket 300 to a junction box. Bracket conduit 335 allows a set of electrical connecting wires 190 in electrical communication with the driver circuitry 180 and passing through the wire conduit 175 to pass through the suspension bracket 300 and junction bracket 330, such that an electrical connection between the set of electrical connecting wires 190 and the line voltage wires 520 may be established. In various embodiments, the suspension bracket 300 may be configured to be mounted flush to a ceiling or other surface.

The suspension bracket 300 may comprise one or more wire mounts 315 each configured for receiving a suspension wire 310. The suspension wire 310 may include a nut, knot or other element that prevents the suspension wire 310 from falling out of the wire mount 315 when the LED flat panel light 100 is suspended from the suspension wires 310. In other embodiments, a friction mount may be used to secure the suspension wires 310 into the wire mounts 315. For example, an end of a suspension wire 310 may be inserted into wire mount 315, a nut and/or the like may then be rotated to tighten the wire mount 315 about the suspension wire 310. It should be understood that a variety of methods may be used to secure a suspension wire 310 into a wire mount 315.

The suspension bracket 300 may be made of a polymer material as is commonly known in the art, aluminum, and/or other appropriate material. In various embodiments, the suspension bracket 300 may be finished so as to provide an aesthetically pleasing pendant light.

IV. SPRING-LOADED WALL CLIPS 400

In various embodiments, spring-loaded wall clips 400 may be secured to the LED flat panel light 100. The spring-loaded wall clips 400 may be configured to mount the LED flat panel light 100 flush with a wall (e.g., inset into drywall, shiplap, paneling, and/or the like). For example, a hole having a diameter slightly larger than the smaller diameter of the frame 110 but smaller than the larger diameter defined by the frame 110 of the LED flat panel light 100 may be cut into a piece of drywall. After connecting the line voltage wires 520 from within the wall to the set of connecting wires 190 of the LED flat panel light 100, the LED flat panel light 100 may be positioned within the hole in the drywall. The spring-loaded clips 400 may rest against and/or grip the back of the drywall to hold the LED flat panel light 100 within the hole in the drywall and flush with the surface of the wall. For example, each spring-loaded wall clip 400 may be configured to be biased against the back of a wall (e.g., drywall, shiplap, paneling, and/or the like) via a spring 430. The lip 112 of the LED flat panel light 100 may prevent the LED flat panel light 100 from falling backward into the wall.

The spring-loaded wall clips 400 may be secured to the LED flat panel light 100 via the knobs 115. For example, each spring-loaded wall clip 400 may be configured to be secured to a knob 115. In some embodiments, the spring-loaded wall clip 400 may include a twist and lock device similar to the mounting bracket 200, may be configured to be secured to knob 115 via a screw 415. In other embodiments, a fastener (e.g., screw) may be used to secure each spring-loaded wall clip 400 to a knob 115. As should be understood a variety of spring-loaded wall clips 400 may be secured to the LED flat panel light 100 and configured to secure the LED flat panel light 100 into a hole in a wall.

V. EXEMPLARY METHODS OF INSTALLING AN LED FLAT PANEL LIGHT 100

Figure 9:
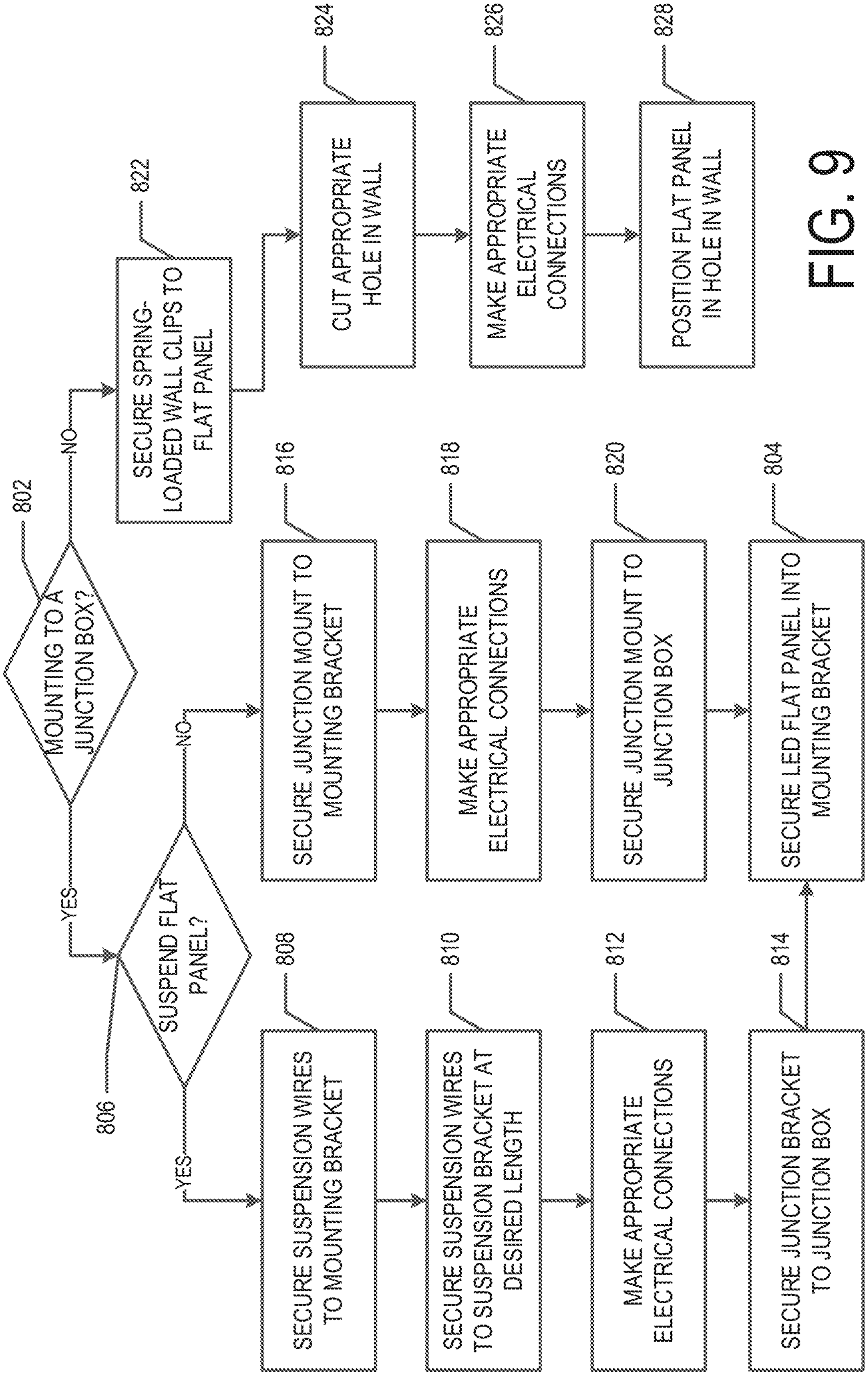
FIG. 9 is a flowchart illustrating a method that may be used to mount an LED flat panel light in accordance with an embodiment of the present invention.
Figure 10:
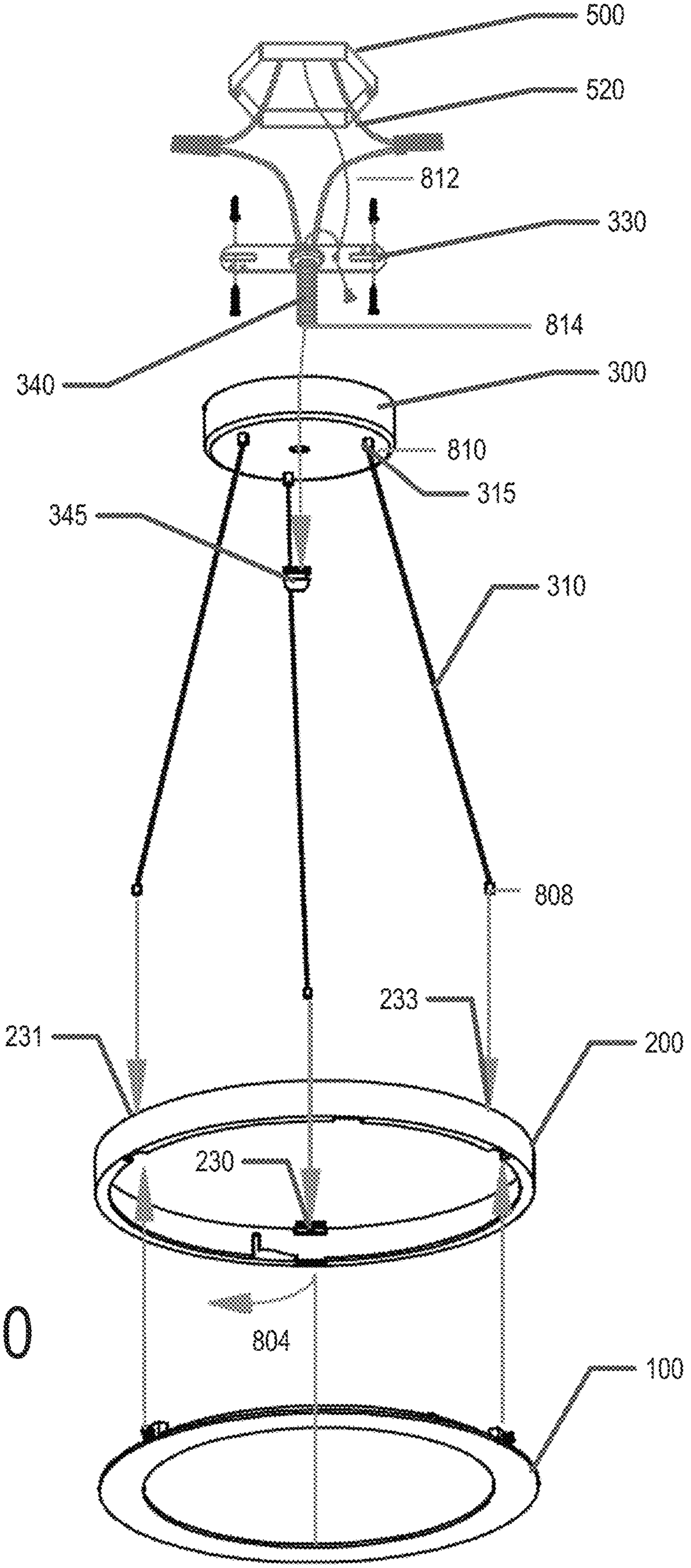
FIGS. 10, 11, and 12 illustrate various processes shown in FIG. 9.
Figure 12:
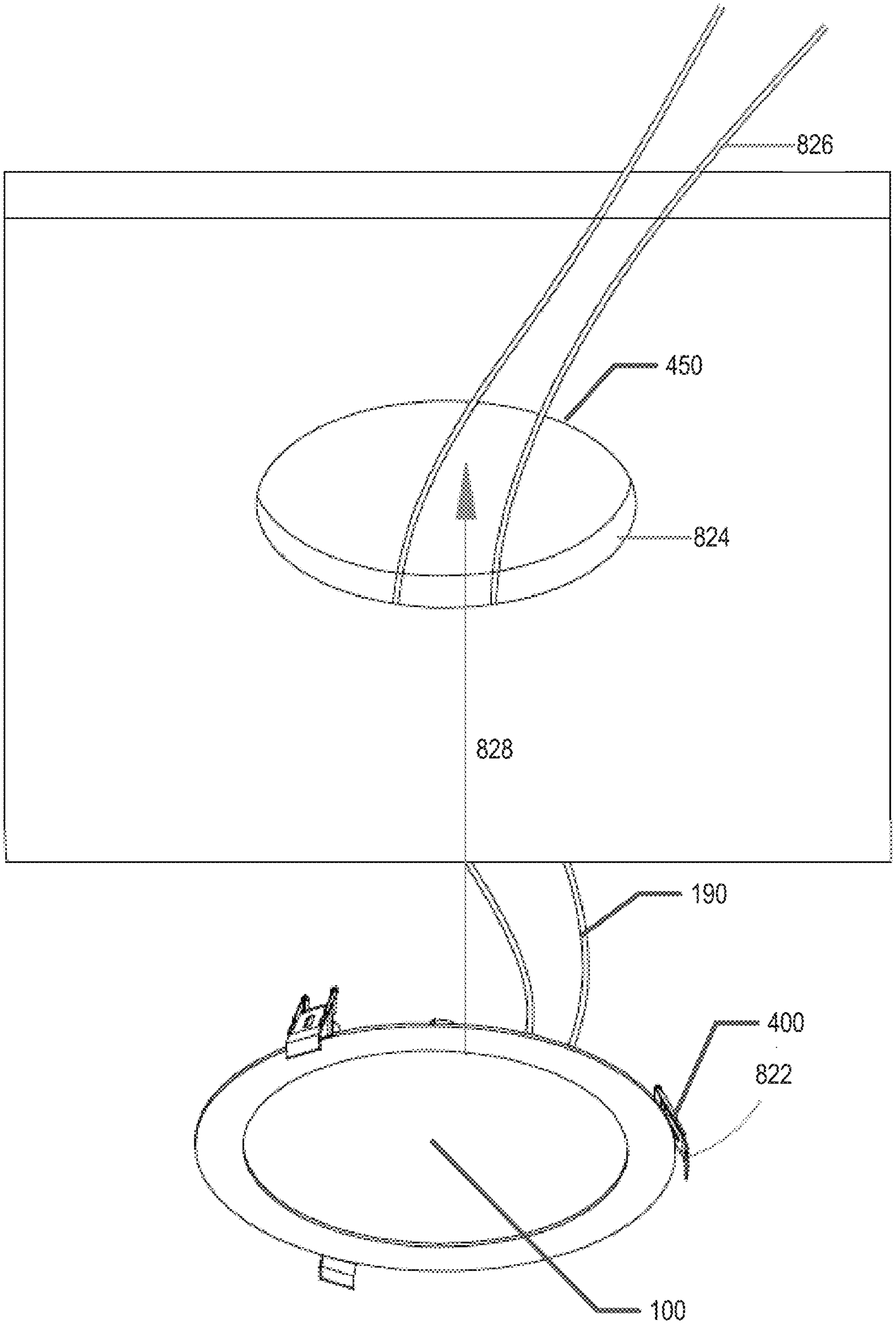

FIG. 9 provides a flowchart of various process and operations that may be completed to install an LED flat panel light 100, in accordance with various embodiments. FIGS. 10, 11, and 12 illustrate some of the steps described in FIG. 9. The process begins at step 802, wherein an installer determines if the LED flat panel light 100 is going to be mounted to a junction box or not. If at step 802 it is determined that the LED flat panel light 100 is to be mounted to a junction box, at step 806, the installer determines if the LED flat panel light 100 is to be suspended or not. If it is decided at step 806 that the LED flat panel light 100 is to be suspended, at step 808, each suspension wire 310 is fed through a tab 230, 231, and 233. For example, one end of each suspension wire 310 may be configured to fit through a hole disposed in a tab 230, 231, 232 while the other end of the suspension wire comprises a nut, knot, crimp, and/or the like that will not fit through the hole in the tab 230, 231, 233. Thus, each suspension wire 310 may be fed through the hole in a tab 230, 231, 233 such that the nut, knot, crimp, or the like is disposed on the side of the tab 230, 231 facing the back cover 170. The suspension wires 310 may thus be retained by the tabs 230, 231, 233 of the mounting bracket 200.

At step 810, the suspension wires 310 are secured to the suspension bracket 300 at the desired length. For example, a suspension wire 310 may be passed through a wire mount 315, a knot may then be tied in the wire or a nut or the like may be secured to the suspension wire 310 to prevent the suspension wire from being pulled back through the wire mount 315 when the LED flat panel light 100 is suspended via the suspension wires 310. In another example, the wire mounts 315 may be configured to clamp the suspension wire 310 at the desired length. For example, a nut may be tightened onto a collapsible sheath, tightening the wire mount 315 about the suspension wire 310. The desired length of the suspension wires 310 may be determined such that the LED flat panel light 100 will hang at the desired height.

If necessary, an appropriately sized hole may be cut into the dry wall or other ceiling/surface finishing element (e.g., shiplap, paneling, etc.) such that the suspension bracket 300 may be flush mounted to the junction box 500. At step 812, the appropriate electrical connections are made such that the LED flat panel light 100 may be provided with electrical power. For example, a set of electrical connecting wires 190 may be passed through the bracket conduit 335. An electrical connection between the set of electrical connecting wires 190 and the line voltage wires 520 from the junction box may be established such that electrical power may be provided to the LED flat panel light 100. At step 814, the junction bracket 330 may be secured to the junction box such that the suspension bracket 300 is mounted flush to a ceiling or other surface from which the LED flat panel light 100 is to be suspended. For example, the junction bracket 330 may be secured to the junction box 500 via one or more screws, and/or the like. In some embodiments, the junction bracket 330 may be secured to the junction box 500 and then secured to the suspension bracket 300, or example, via a threaded rod extended through the bracket conduit 335, and/or the like.

At step 804, the mounting bracket is secured to the LED flat panel light 100. For example, after the mounting bracket 200 is suspended from the suspension bracket 300, electrical connections have been made and/or the suspension bracket 300 is mounted to the junction box 500, the LED flat panel light 100 may be secured to the mounting bracket 200. For example, the knobs 115 may be positioned within the notches 215 and the mounting bracket 200 and the LED flat panel light 100 may be rotated with respect to one another until the knobs 115 are secured via the locking mechanisms 220, and/or the like.

Returning to step 806, if it is determined that the LED flat panel light 100 is not to be suspended, the installer continues to step 816. At step 816, the junction mount 240 may be secured to the mounting bracket 200. For example, the junction mount 240 may be secured to the mounting bracket 200 via fasteners 235 (e.g., screws) securing the junction mount 240 to the tabs 231, 232.

If necessary, an appropriately sized hole may be cut into the drywall or other wall/ceiling finishing such that the LED flat panel light 100 may be mounted flush to the junction box. At step 818, the appropriate electrical connections may be made to provide electrical power to the LED flat panel light 100. For example, a set of electrical connecting wires 190 may be secured in electrical communication with the line voltage wires 520 from the junction box 500. At step 820, the junction mount 240 is secured to the junction box 500. For example, fasteners (e.g., screws) may be used to secure the junction mount 240 to the junction box 500.

At step 804, the mounting bracket 200 is secured to the LED flat panel light 100. For example, after the junction mount 240 is secured to the mounting bracket 200, the appropriate electrical connections are made, and/or the mounting bracket 200 is secured to the junction box 500 via the junction mount 240, the LED flat panel light 100 may be secured to the mounting bracket 200. For example, the knobs 115 may be positioned within the notches 215 and the mounting bracket 200 and the LED flat panel light 100 may be rotated with respect to the mounting bracket 200 until the knobs 115 are secured via the locking mechanisms 220, and/or the like.

If at step 802, it is determined that the LED flat panel light 100 is not to be mounted to a junction box, the spring-loaded wall clips 400 are secured to the LED flat panel light 100 at step 822. For example, a screw 415 may be positioned in each spring-loaded wall clip 400 such that the spring-loaded wall clip is secured to a knob 115. In some embodiments, the knobs 115 may be removed providing threaded holes to receive the screws 415.

At step 824, an appropriately sized hole 450 is cut into the drywall or other wall/ceiling finishing material. For example, the hole should be approximately the same size as the back of the LED flat panel light 100, but smaller than the lip 112 portion of frame 110. For example, the hole 450 may have a diameter larger than the first diameter d1 and smaller than the second diameter d2 (d1<diameter of hole<d2). At step 826, the appropriate electrical connections are made such that electrical power can be supplied to the LED flat panel light 100. For example, a connection between a set of electrical connecting wires 190 and a set of line voltage wires 520 may be established such that electrical power may be provided to the electrical components (e.g., the one or more LEDs 130 and/or driver circuitry 180) of the LED flat panel light 100. In one embodiment, the LED flat panel light 100 may comprise an internal power source (e.g., a battery) and may not require being in electrical communication with line voltage wires 520 for the LED flat panel light 100 to operate.

At step 828, the LED flat panel light 100 is positioned within the wall, ceiling, and/or the like. For example, after the spring-loaded wall clips 400 are secured to the LED flat panel light 100 (e.g., via knobs 115 and fasteners) and/or an the appropriate electrical connections are made, the LED flat panel light 100 is positioned within hole 450. For example, the spring-loaded wall clips 400 may be biased against and/or grip the back of the drywall, shiplap, paneling, or the like such that the LED flat panel light 100 does not fall out of the hole in the drywall, shiplap, paneling or the like. The lip 112 may be flush against the front of the drywall, shiplap, paneling and/or the like such that the LED flat panel light 100 does not fall back into the wall, ceiling, and/or the like.

VI. CONCLUSION

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A light emitting diode (LED) flat panel lighting device comprising:

an LED flat panel light comprising:

a front cover;

a back cover;

one or more LEDs disposed between the front cover and the back cover; and a frame having an interior edge in contact with a perimeter of the front cover and a perimeter of the back cover, wherein a portion of the frame proximate the back cover defines a first diameter and a portion of the frame proximate the front cover defines a second diameter, and wherein the second diameter is larger than the first diameter so as to form a lip on the frame configured to engage a first side of a surface such that the LED flat panel lighting device is mountable within a hole in the surface.

2. The LED flat panel lighting device of claim 1, wherein the surface is a wall or a ceiling.

3. The LED flat panel lighting device of claim 1, further comprising one or more bias components, the one or more bias components configured to engage a second side of the surface.

4. The LED flat panel lighting device of claim 3, wherein the one or more bias components are coupled to a portion of the frame between the portion of the frame proximate the back cover and the portion of the frame proximate the front cover.

5. The LED flat panel lighting device of claim 3, wherein the frame comprises one or more mating mechanisms and the one or more bias components are each secured to a respective mating mechanism of the one or more mating mechanisms.

6. The LED flat panel lighting device of claim 5, wherein the one or more bias components are secured to the respective mating mechanism via a respective mechanical fastener.

7. The LED flat panel lighting device of claim 5, wherein the one or more mating mechanisms are protrusions comprising respective screw holes configured to enable securing each of the one or more bias components to the respective mating mechanism of the one or more mating mechanisms via a screw.

8. The LED flat panel lighting device of claim 1, further comprising a ring to which the one or more LEDs are mounted, wherein the frame, the front cover, and the back cover enclose the ring into an interior of the LED flat panel light.

9. The LED flat panel lighting device of claim 1, wherein the one or more LEDs are disposed between the front cover and the back cover such that the one or more LEDs emit light toward a center of a space between the front cover and the back cover.

10. The LED flat panel lighting device of claim 9, wherein the LED flat panel light is configured to emit light outward through the front cover.

11. The LED flat panel lighting device of claim 1, wherein the surface is drywall, paneling, or shiplap.

12. The LED flat panel lighting device of claim 1, wherein a depth of the LED flat panel lighting device from the back cover to the front cover is substantially equal to a thickness of the surface.

13. The LED flat panel lighting device of claim 1, wherein the LED flat panel light comprises an internal power source.

14. The LED flat panel lighting device of claim 1, wherein the front cover is translucent.

15. A lighting assembly comprising:

an LED flat panel light comprising a front cover and a back cover;

a frame comprising one or more mating mechanisms and an interior edge, the interior edge being in contact with a perimeter of the front cover and a perimeter of the back cover, wherein a portion of the frame proximate the back cover defines a first diameter and a portion of the frame proximate the front cover defines a second diameter, and the second diameter is larger than the first diameter so as to form a lip on the frame configured to engage a first side of a surface such that the lighting assembly is mountable within a hole in the surface; and one or more bias components coupled to the frame, the one or more bias components configured to engage a second side of the surface when the lighting assembly is mounted within the hole in the surface.

16. The lighting assembly of claim 15 wherein the portion of the frame proximate the front cover defines a lip configured to act as trim about a front perimeter of the LED flat panel light.

17. The lighting assembly of claim 15, wherein the lighting assembly is configured to be flush-mounted within the surface such that the one or more bias components are biased against the second side of the surface and the lip engages the first side of the surface.

18. The lighting assembly of claim 15, wherein a depth of the LED flat panel light from the back cover to the front cover is substantially equal to a thickness of the surface.

19. The lighting assembly of claim 15, wherein the LED flat panel light comprises an internal power source.

20. The lighting assembly of claim 15, wherein the LED flat panel light comprises one or more LEDs, the one or more LEDs are disposed between the front cover and the back cover such that the one or more LEDs emit light toward a center of a space between the front cover and the back cover, and the LED flat panel light is configured to emit light outward through the front cover.

* * * * *